United States Patent [19]

Schlimbach

[11] Patent Number: 4,493,593
[45] Date of Patent: Jan. 15, 1985

[54] METHOD AND DEVICE FOR CONTINUOUS TRANSPORTING POWDERED, FINE-GRAINED AND COARSE-GRAINED MATERIALS

[75] Inventor: Heinrich Schlimbach, Essen, Fed. Rep. of Germany

[73] Assignee: Ferroplast Gesellschaft für Metall- und Kunststoffepzeucnisse mbH, Hattingen, Fed. Rep. of Germany

[21] Appl. No.: 393,353

[22] Filed: Jun. 29, 1982

[30] Foreign Application Priority Data

Sep. 29, 1981 [DE] Fed. Rep. of Germany ....... 3138657

[51] Int. Cl.³ ............................................. B65G 53/16
[52] U.S. Cl. ................................... 406/146; 406/116; 406/124; 406/136; 406/167
[58] Field of Search ............... 406/146, 164, 167, 134, 406/136, 86, 88, 92, 122, 124, 84, 137, 113–116, 120

[56] References Cited

U.S. PATENT DOCUMENTS 2,710,232 6/1955 Schmidt et al. .
3,001,652 9/1961 Schroeder et al. ................. 406/146
3,311,421 3/1967 Heinemann ......................... 406/120
3,854,634 12/1974 Hart .................................... 406/136
4,029,364 6/1977 Salzer ................................. 406/115

FOREIGN PATENT DOCUMENTS 8270 2/1979 European Pat. Off. .
2247904 10/1974 France .
1412693 11/1975 United Kingdom .

Primary Examiner—Jeffrey V. Nase
Assistant Examiner—Daniel R. Edelbrock
Attorney, Agent, or Firm—Michael J. Striker

[57] ABSTRACT

A device for continuous transporting granulated material includes a storage container and a tubular conveyor housing positioned below and storage container and receiving the granulated material therefrom. The conveyor housing is supplied with pressurized air. A separating member is movable longitudinally of the conveyor housing between a space containing pressurized air and a space containing the granulated material. The separating member is peripherally spaced from the inner wall of the housing to form a through passage therebetween, which continually connects the pressurized air space with the space containing the granulated material. The separating member is provided with an opening connected to a discharge pipe. The separating member forms in the conveyor housing a movable pressure cushion of varying volume which in turn forms in the housing a pressure gas-material mixture which is discharged from the housing through the opening in the separating member and the discharge pipe.

21 Claims, 3 Drawing Figures

METHOD AND DEVICE FOR CONTINUOUS TRANSPORTING POWDERED, FINE-GRAINED AND COARSE-GRAINED MATERIALS

BACKGROUND OF THE INVENTION

The present invention relates to methods and devices for transporting of various materials in general. More particularly, the invention relates to a method and device for transporting the materials in the powdered, fine-grained or coarse-grained state.

Such devices as blast apparatus are known for material injection, backfilling and building of dams in underground mines. Such blast machines have been utilized with devices for transporting construction materials. The transporting device usually includes storage bins or storage containers from which construction materials are transported through relatively long screw conveyors to a work site. In such machines the material feed line is usually composed of a number of identical storage containers positioned in series one after another and at a distance from each other. The screw conveyor of approximately seven meters or more is arranged in a tubular housing located below those storage containers whereas each storage container is connected to the tubular housing by an opening which may be closed by a slide. A drive for the screw conveyor located in the close vicinity of the storage containers includes a motor, a gear unit and a coupling arranged on a floor of the seam in the mine. Since the screw conveyor must be positioned at the area facing its drive station it can discharge the material only downwardly. However, there is a requirement in ground works that in order to provide for a sufficient space for conveyor throughput on the floor of the seam the material discharged from the inclined conveyor, and particularly the screw conveyor, should be transported pneumatically in the upward direction so that the construction material then falls and is processed to a suitable blast machine in the known fashion.

A disadvantage of such known devices is first in that the blast machine, storage containers and drive stations with the conveyors are practically immovable which renders further construction operation difficult. The whole installation is therefore bulky, and the space usually required for such an installation is insufficient because the drive station and the screw conveyors positioned below the storage containers require a great deal of space. Moreover, it is required in ground works that the throughput of the screw conveyor should be obtained within the space on the floor of the seam. This requires considerable space. Due to the fact that in underground construction works some other conveying means can also function in the region of the above-described transporting device such a bulky installation often causes considerable difficulties. In order to overcome the disadvantages of such bulky installations and make construction works in the mine possible it has been suggested to increase air pressures in the blast machine and/or increase tube dimensions in the pipes between the blast machine and the outlet of the conveyor. However, even with all above suggestions the installation is not always efficient.

A further disadvantage of conventional constructions of material-transporting devices is that although screw conveyors if efficiently used are rather inexpensive they are sensitive to the change of the grain size of the construction material being transported because the screw conveyors are usually designed for a certain material. If the material to be transported is changed to the material having a different grain size this can result in an operation disorder caused by clogging of the conveyor. In such cases, particularly when conveyors are located below the storage containers and very long screw conveyors are utilized the clogging can lead to the blocking of the whole installation. This is also possible in the inclined conveyor operating with one screw conveyor. Furthermore, the material being conveyed must pass through the whole length of the screw conveyor. Long screw conveyors, however, tend to bend, which makes their use rather limited.

SUMMARY OF THE INVENTION

It is an object of the present invention to provide an improved transporting device of any required length.

It is a further object of the invention to provide an improved device for transporting powdered, fine-grained or coarse-grained materials in the same conveyor. The device of the invention is particularly suitable for transporting construction materials and construction mixtures, such as mortar or granulated materials.

It is a still further object of the invention to provide a device which ensures complete emptying of the material-containing housing and quick and effective discharging of said material into a discharge line.

These and other objects of the invention are attained by a method for continuous transporting materials in powder, fine-grained or coarse-grained state, particularly in use in underground mines, comprising the steps of discharging the material being transported from at least one storage container into a conveyor housing, supplying the conveyor housing with a pressure gas, generating in said housing a pressure gas cushion and continuously maintaining in said gas a pressure which is greater than a counter pressure in said housing and moving said pressure gas cushion against the material contained in said housing to thereby discharge a mixture of the pressure gas and the material being transported formed in said housing from said conveyor housing.

The main advantage of the method according to the invention resides in that conveyors of practically any required length and cross-section may be utilized within the limited space, which conveyors may be utilized for transporting any kinds of materials, such as litter, sewage or any quasiflowable materials, construction materials and construction mixtures, for example sand, grit, cement, cement mixtures, mortar mixtures, granulates, hygroscopic materials, for example materials for building of dams underground, and also such materials as drugs or grain. The method of the invention provides for complete emptying of the conveyor housing containing the material being transported.

In the method according to the invention the movable pressure gas cushion serves to move and thus discharge the material being conveyed from the conveyor housing so that no bridges, deposits or incrustations can be formed. The material contained in the container housing is seized by the pressure gas cushion, mixed with the pressure gas and then discharged into the discharge line. It is impossible that pressure gas, for example pressure air will meet on its way small resistance and will therefore form stream channels, particularly in the regions of uncontrolled cross-sections throughout the housing where the material will be advanced, whereas the material in all the remaining cross-sections, particularly at the locations of incrustations, will lie on the floor of the housing. The pressure gas cushion extends through the whole cross-section of the housing so that the latter is completely emptied.

Such a complete emptying of the housing is obtained due to ejection action of the strong turbulent streams produced in the peripheral area of the housing, which streams extend in the direction of the discharge opening into the discharge line whereby even in the areas of incrustations the efficient discharge of the material is ensured.

A ratio between the pressure gas amount and the amount of the material contained in the conveyor housing may be controlled by a velocity with which the pressure cushion is moved against the material and/or by a pressure differential between the gas pressure in the pressure gas cushion and the counter pressure in the conveyor housing.

The method according to the invention is very effective because relatively small quantity of pressure gas, i.e. pressure air, is required to transport great quantity of the material, which is very important especially in underground works, such as building of dams, backfilling and material injections and should not be underestimated.

It is very advantageous that the conveyor housing is completely emptied along its length. In underground construction works where the height available for operating is limited it is important to efficiently use the space along the mine, in this case the utilization of the tubular housing through which the pressure gas cushion is moved to empty the housing is very effective.

Furthermore, the utilization of the pressure gas cushion substantially reduces potential wear of the components of the conveyor because no abrasive substance is involved in the transporting process. Moreover, controllable peripheral zones of the pressure gas cushion cause loosening up of the material being conveyed, intensive fluidizing of the material, mixing of the pressure gas with the material, and continuous transporting of the material into the discharge line.

According to further features of the invention the pressure gas cushion may be moved against the material with such a velocity that at least approximate uniform movement of the pressure gas cushion axially of the housing of the conveyor is maintained.

The pressure gas cushion may be moved against the material so quickly that a predetermined gas-air-mixture-ratio in the housing is obtained.

It is to be noted that pressure air is practically always available underground. Therefore, although any pressure gas may be used in the method of the invention pressure air is, of course, preferable. Such other pressure gases, for example inert gases may be also utilized, particularly in food industry for transporting grain, drugs, drug mixtures or chemical materials. In order to form the pressure gas cushion in underground works or also in other fields it is necessary to provide a pressure gas supply line and connect this line to a pressure gas source. This supply line may be provided with a control member, such as a shutter or a diaphragm which, after the pressure gas cushion has been formed is more or less open to maintain a sufficient pressure gas supply to the pressure gas cushion. The pressure gas cushion may be continuously maintained under uniform pressure.

In accordance with further features of the invention the pressure gas cushion has a periphery and it is continuously supplied at its periphery with the pressure gas. This ensures that even adhesive or hygroscopical materials are taken off the walls of the conveyor housing by turbulent streams and conveyed to the discharge line. The method of the invention ensures that no material remains in the housing and the housing is emptied completely.

The objects of the invention are further attained by a device for continuous transporting materials in powder, fine-grained or coarse-grained state, particularly dam materials in underground mines, comprising at least one storage container containing a material to be transported; a conveyor located below said storage container and receiving the material discharged from said container, said conveyor including at least one tubular housing into which the material is discharged and having an axis; a gas pressure supply means connected to said housing and forming therein a pressure gas space; a separating member axially movable in said housing and having one side facing said pressure gas space and an opposite side facing a conveyor space containing said material, said separating member being formed with at least one through passage continuously connecting said pressure gas space with said conveyor space so that a pressure gas cushion of a variable size is formed in said conveyor space in the region of said opposite side; said pressure gas cushion being supplied with the pressure gas from said pressure gas space whereby a material-pressure gas-mixture stream is formed; and a conveyor discharge pipe connected to said conveyor space and into which said mixture is discharged, said separating member being adapted to move said gas pressure cushion axially of said housing to ensure complete emptying of the housing.

The material may be discharged from the storage container into the conveyor housing under its weight.

The separating member may have at least one opening connected to the conveyor discharge pipe.

The device may further include a coupling member axially movable in said housing and rigidly connected to said separating member, said separating member and said coupling member forming a piston-shaped structure.

The main advantage of the transporting device according to the invention is that it is very simple and has only one movable part. Therefore the potential wear of the device components is significantly reduced. The material being transported is conveyed by the pressure gas cushion providing ejection action at the periphery of the separating member but not by scratching and scraping elements. The separating member itself and the coupling member serve not for loosening up and advancing the material but rather for moving the pressure gas cushion which contacts the material. Pressure gas or pressure air passes the through passage formed along the periphery of the separating member and forms a strong turbulent stream which imparts ejection action to the material, takes off that material from all the corners of the housing, fluidizes said material and forces the material towards the discharge pipe.

The fact that the through passage is formed at the periphery of the separating member, and more particularly between the periphery of the separating member and the inner peripheral wall of the housing, excludes the contact between the separating member and the housing.

The through passage may be uniform along the periphery of the separating member and may be slit-shaped or formed as a slit-like nozzle. Such a structure will cause high velocities of pressure gas streams and subsequently high entry velocity of the pressure gas into the pressure gas cushion which will result in intensive loosening up, mixing and advancing of the material.

The separating member may be peripherally spaced from the inner wall of the housing a distance forming the aforementioned through passage. This clearance or passage operates as a ring-shaped nozzle so that the pressure gas penetrates the material peripherally and fills the pressure gas cushion formed between the separating member and the material in the housing. This renders it possible that the clearance may be varied depending on the material being conveyed. Furthermore, the chute angle of inclination of the separating member can be also varied depending on the material being transported such that, for example particularly great amount of pressure gas enters the region of the cushion in the lower part of the housing and pressure gas flow velocities at the lateral and upper regions of the pressure gas cushion will be greater for relatively small gas volumes.

The through passage may be formed as a continuous or uninterrupted slit. In such a modification the velocities of the pressure gas in the pressure gas cushion and thus vortexes in the gas streams will be increased.

The slit may be nozzle-shaped and narrowed in the direction towards the material contained in the conveyor space. It is to be understood that in all the embodiments of the invention the material is discharged into the housing from the storage container under its own weight and is distributed in the housing according to the angle of natural slope. It is advantageous therefore that the side of the separating member facing away from the material in the housing is inclined to a horizontal at angle corresponding to the angle of natural slope. In such a modification particularly high velocities of gas and material flows in the housing can be obtained.

The side of the separating member which faces away from the material in the housing may be provided with an inclined diverting nose. This nose may be hump-shaped and can extend at an angle corresponding to the angle of natural slope so as to form a distributing projection for pressure gas entering the pressure gas cushion.

The separating member may have a shape of a hollow box so as to provide on the one hand certain guide for the pressure gas cushion, and on the other hand, to guide the mixture of the pressure gas and material into the discharge pipe.

The conveyor discharge pipe may include two telescopically arranged tubes, an outer one of said tubes being rigidly connected to said housing and an inner one of said tubes being rigidly connected to the separating member in the region of the opening. Such a structure ensures the complete transfer of the pressure gas-material mixture into the discharge pipe.

The discharge opening may be provided in the lower part of the separating member. The positioning of the discharge means at the lower part of the housing is very advantageous since it further warrantes a complete emptying of the housing.

The device may further include drive means for moving said coupling member axially in two opposite directions. Those drive means include each a cylinder-piston unit located outside of said housing and laterally thereof.

Each cylinder-piston unit may include a piston, the pistons of said cylinder-piston units being connected to each other by a crossbar, said crossbar being coupled to said coupling member. This provides for a very rigid construction which does not require a great deal of space, particularly in the height, which is important in undergound works.

The coupling member in the region of the separating member may be provided with a number of openings which are connected to a pressure gas channel guided through the coupling member.

The separating member may be provided with a feeler projecting in the direction toward the material contained in the housing, said feeler controlling a smallest distance of movement of said coupling member driven by said drive units. The feeler defines the distance at which the separating member and the material in the housing are spaced from each other. If the separating member travels closely to the material within the housing the feeler which controls the movement of the drive units will switch them off or lag them or again switch them on when a predetermined distance between the separating member and the material is reached or exceeded.

The pressure gas supply conduit may be provided with a control member which may be a shutter or a diaphragm.

A traction dynamometer may be arranged on said coupling member to control the drive units. The dynamometer may control the drive units to maintain a predetermined distance between the separating member and the material in the manner similar to the described herein for a feeler.

The conveyor may include a plurality of housings into which said material is discharged, said housings being operated by a remote control. These housings may be operated selectively by the remote control so as to provide continuous or almost continuous discharge of the material into the discharge line.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
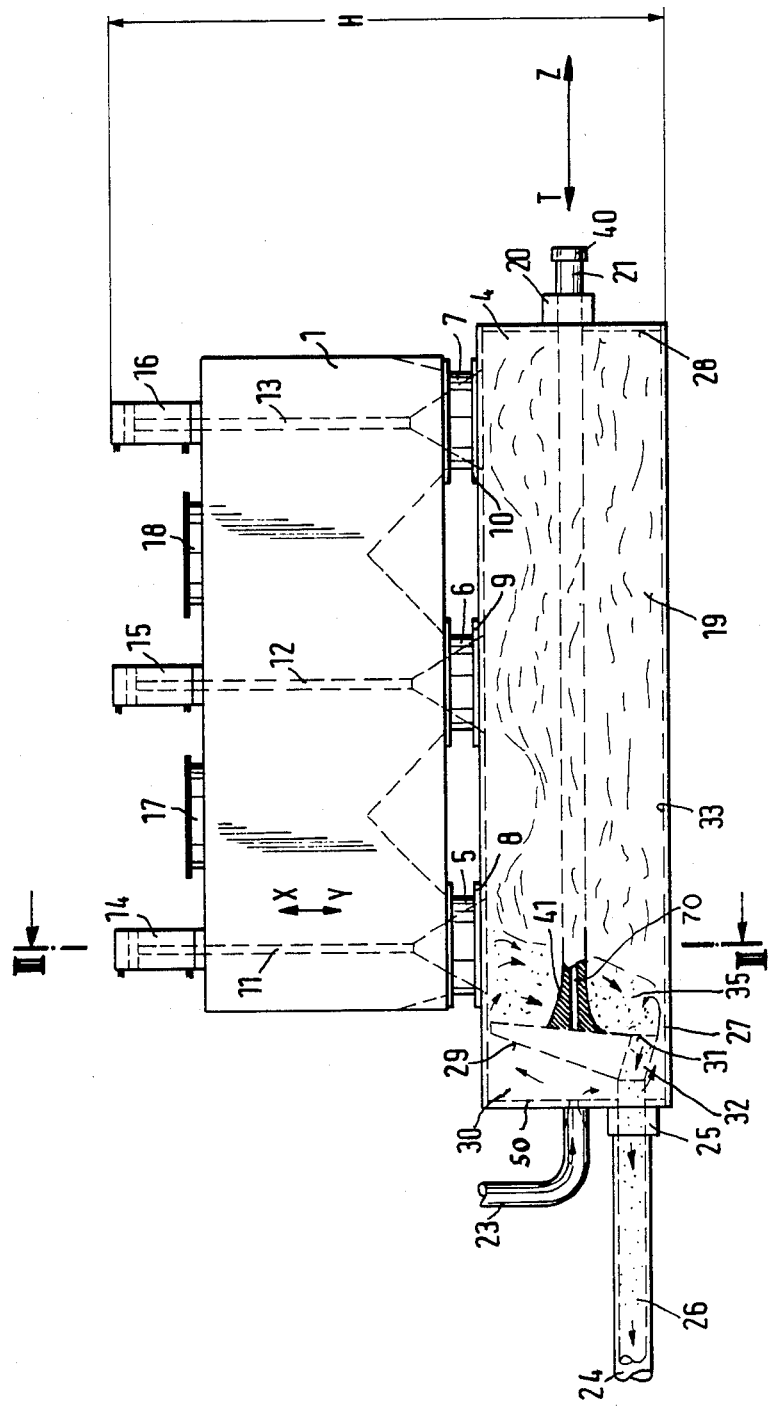
FIG. 1 is a side view of a device for continuous conveying powdered, or fine, or coarse-grained materials according to the invention.

Referring now to the drawings, and first to FIG. 1, the latter illustrates a device which may be used, for example with a blast apparatus positioned in an underground mine. Such a device may be suitable for building of dams, backfilling or material injections in little capacity production and huge capacities as well. The device may be also, without any problems, moved or advanced in accordance with working requirements or hung up on a monorail conveyer, which is not illustrated herein.

In principle, the device can be arranged for example on skids which is also not shown in the drawing.

A further advantage of the material transporting device according to the invention is that the construction height of the whole device is rather small. Of course, it is advantageous that the transporting or conveying device or devices are positioned below the storage container or a number of the storage containers for a material to be transported, such as dike or dam material and the pressure air supply may be provided through a flexible tubular conduit. This device does not require so much space as conventional inclined conveyors, storage bins, box wheels or air pressure tanks usually utilized for material transportation. This is different from the known blast apparatus-drive units positioned below the material transporting device, wherein the blast material should be transported outside through the inclined conveyor. Such parts of the units as a drive motor, gear unit and couplings which are normally used in conventional screw conveyors require particularly a great deal of space are not needed. Therefore, the storage container 1 or a number of storage containers may be positioned rather deep relative to the floor of the seam in the narrow space in a mine, which is advantageous.

The device for transporting materials may be positioned in a sled-like stand so that it can be advanced in accordance with operation steps. It is also possible that the device can be hung up on a monorailway conveyer and transported thereon according to the required operation steps. Such an arrangement is possible if the construction height of the device is relatively small as compared to those known in the art and such that the device itself can be lifted. Thereby the distance between the device and the work site is maintained optimal.

A further advantage of the material transporting device of the invention resides in its ability to substantially increase the capacity of the production if required. This may be obtained because the number of the housings and thus the number of material-transporting conveyors may be increased or reduced within the practical rational limits when required. It is also advantageous that the use of conventional pressure-chamber blast apparatus and conveyors can be avoided because the material transport is obtained by means of pressure air.

Figure 3:
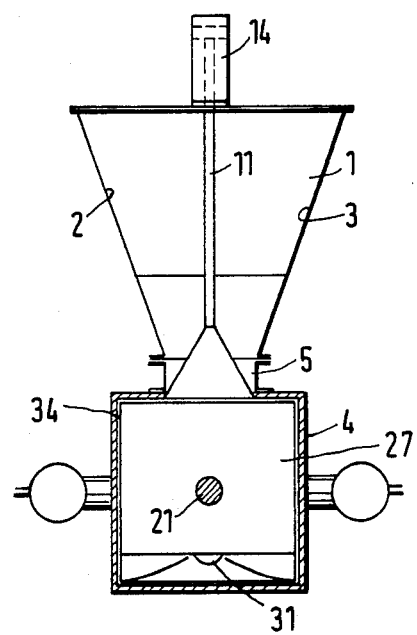
FIG. 3 is a sectional view on line III—III of FIG. 1.

A storage container 1 is filled with a blast material, a structural material for building dams in underground coal mines, a granulated material, mortar, structural mixture drug, grain, hygroscopic material, sand, grit or the like. Walls 2 and 3 of the container 1 as shown in FIG. 3 are inclined downwardly whereby a material to be conveyed is discharged under its weight downwardly into a tubular housing 4. Housing 4 is connected to the storage container 1 by means of tubular support elements 5, 6 and 7 spaced from each other. The material is fed into housing 4 through those tubular support elements. Support elements 5, 6 and 7 are provided with respective lock members 8, 9 and 10 which are connected to respective piston rods 11, 12, 13 adapted for reciprocating movement by means of a suitable pressure medium, for example hydraulic oil or pressure air operating a drive, such as a cylinder-piston unit. Rods 11, 12, 13 and lock members 8, 9 and 10 thus can move in two opposite directions indicated by arrows X and Y so as to selectively release, i.e. open openings of the tubular supports 5, 6 and 7 and thus permit the material to flow into the housing 4 or to lock the openings of the tubular supports 5, 6 and 7. The respective drive units of the cylinder-piston type are denoted in the drawing by reference characters 14, 15 and 16.

Reference numerals 17 and 18 identify filling openings for a material contained in the storage container 1. Housing 4 is illustrated in FIG. 1 in its filled condition. The material is denoted with reference numeral 19.

Centrally of the tubular housing 4 is positioned a piston-shaped coupling member 21 the end of which extends outwardly from the housing through a sleeve 20 sealingly mounted at one end face of housing 4. Coupling member 21 is adapted to slide within the housing 4 in two opposite directions denoted by arrows T and Z by means which will be explained in detail hereafter.

As seen in FIG. 1 in particular, housing 4 extends in a horizontal plane projecting below the storage container 1 whereby the total height of the construction may be considerably reduced, particularly if the upwardly extended drive units 14, 15 and 16 do not project beyond the upper border of the storage container. This may be obtained by positioning the drive units 14 to 16 laterally of the storage container and employing of racks or bevel gears in the device.

At the front side of the housing 4 opposite to the sleeve 20 is provided a pressure gas supply conduit 23 which is connected to a pressure gas source not illustrated herein. In the embodiment shown in FIG. 1 a discharge pipe 24 communicating with the housing 4 is releasably mounted on that housing by means of a coupling 25. Discharge pipe 24 is located below the pressure gas supply conduit 23. A tubular member or section 26 is telescopically positioned within discharge pipe 24 and arranged so that it can slide longitudinally of pipe 24. This tubular member 26 is sealed at its outer periphery in the area of coupling 25, for example by means of a plug sleeve, or labyrinth seal or loop seal or the like. The tubular member 26 at its other end is rigidly connected to a separating or partition element 27 of a box-like shape. The tubular member 26 opens into a hollow box-like part of the separating element 27 and thus into a space formed between the separating element 27 and a front side wall 28 of housing 4 whereas pressure gas fed through conduit 23 flows into a space 30 formed between the rear side 29 of the separating element 27 and the side wall 50 of the housing 4.

The tubular section 26 of the discharge pipe 24 is connected to an opening 31 of the separating element 27 provided in its lower region and so formed that a relatively short channel section 32, which is inclined upwardly, is provided, which channel section opens into the tubular section 26 of discharge pipe 24.

As seen in FIG. 1 the rear side 29 of the separating element 27 may be formed with an inclined diverting nose. The degree of inclination of that diverting nose may correspond to a chute angle for a selected material being transported.

As seen in FIG. 3 lateral walls of the hollow box-shaped separating element 27 form in the direction of opening 31 a kind of a funnel which at the lower wall of the separating element 27 merges into channel section 32.

The separating element 27 at all peripheral walls thereof is spaced from the inner peripheral wall 33 of the housing 4. The clearance is designated by reference numeral 34. This clearance may be circumferentially uniform or non-uniform. For example, in the region of the opening 31 this clearance may be greater than that at the lateral and the upper sides of the separating element. Therefore, the separating element at its circumference has no contact with the internal wall 33 of housing 4. In a modified construction the separating element 27 may be provided with a number of guide rods which may be distributed along the circumference of the element. Those rods may be integrally formed with the separating element or may be made out of a friction material, for example lubrication alloy, PTFE, plastics or the like. The modified construction with the number of guide rods is not shown in the drawings.

It is understood that the space 30 connected to the pressure gas supply conduit 23 is always in communication with the space enclosed between element 27 and wall 28 through the clearance 34. FIG. 1 shows the coupling member provided with a through channel 70. In the space located immediately before wall 41 of the separating element 27 is formed a pressure air cushion 35, which cushion may be moved axially in two opposite directions indicated by arrows Z and T by a volume of stream of the pressure gas and/or by the lifting pressure and/or by the velocity of the pressure gas and in dependence upon the forward or backward movement of the separating element 27 against material 19 contained in housing 4.

Figure 2:
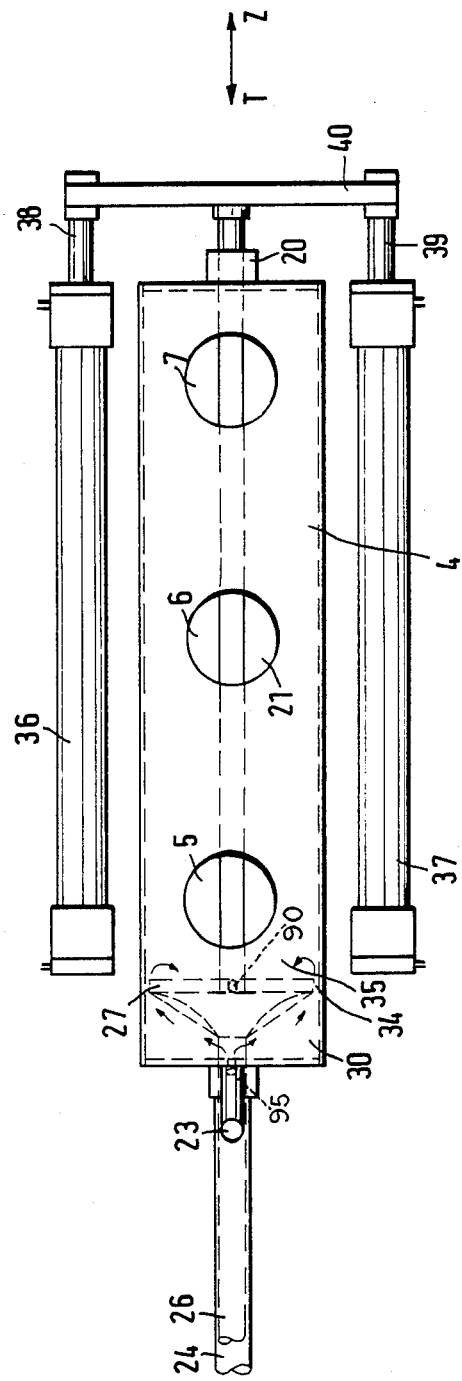
FIG. 2 is a top view of the device of FIG. 1, but with a storage container removed.

The streams of the pressure gas flowing from the space 30 towards pressure gas cushion 35 are clearly seen in FIG. 2. This figure also illustrates drive means for the separating element 27, which drive means include a pair of motor drives 36 and 37 each positioned laterally and longitudinally of the housing 4. The motor drives 36 and 37 may be, for example cylinder-piston units with reciprocally movable rods displaced by means of pressure air or hydraulic oil. The longitudinal axes of drive units 36 and 37 extend parallel to the longitudinal axis of housing 4 and to the axis of the coupling member 21. Pistons 38 and 39 of units 36 and 37 are connected to each other by a crossbar 40 which in turn is connected to the projecting end of the coupling member 21. The energy sources for drive units 36 and 37 are not shown in the drawings.

The operation of the device for transporting a material is as follows:

If the separating element 27 is in its front position as shown in FIG. 1 and 2 and housing 4 is empty the next step would be switching on of the drive units 14, 15 and 16 the piston rods 11, 12 and 13 of which will move in the downward direction Y so that the material being transported will slip from the storage container 1 into housing 4 through the openings in the tubular supports 5, 6 and 7. After the housing 4 has been filled with the material 19 piston rods 11, 12 and 13 upon the reverse operation of drive units 14, 15 and 16 will be moved in the direction X and the lock members 8, 9 and 10 will be moved to their closed position. Subsequently, pressure gas is supplied into conduit 23 so that the pressure gas, and particularly pressure air of a predetermined pressure and/or predetermined velocity per time unit will flow into space 30. The pressure gas entered the space 30 flows around the separating element 27 through the passage or clearance 34 and forms a pressure gas cushion 35 in the region of housing 4 immediately behind the separating element 27. The pressure gas diverted by the inclined nose 29 and passing the clearance 34 will not only loosen up the material 19 contained in housing 4 but will also form a turbulent stream of mixed pressure gas and material which will flow toward the opening 31 and then into the tubular section 26 and discharge pipe 24.

An operator will then switch on the drive units 36 and 37 so that the coupling member 21 connected to crossbar 40 and pistons 38 and 39 will move with a predetermined speed in the direction Z causing the uniform axial movement of separating element 27 and thus axial extension of pressure gas cushion 35. An optimal and complete emptying of housing 4 can be obtained by an optimal control of the pressure gas cushion or by controlling an advancing speed of separating element 27 in axial direction within housing 4. While drive units 36 and 37 are switched on the separating element 27 reaches the side wall 28 of housing 4 or reaches the position approximately against the side wall 28 because the immediate or direct location of the separating element 27 opposite to the pressure gas cushion is not required. Housing 4 in this position is completely emptied along its length and in all cross-sections due to the formation of intensive turbulent streams of material mixture per cubic meter of a carrier gas, and particularly per a cubic meter of pressure air, which results in high loads and very high efficiency of material transporting which in turn leads to sufficient cost reductions.

As seen in FIG. 1 the wall of the separating element 27, which faces the material contained in the housing, is inclined to a horizontal at an angle which corresponds to the angle of natural slope. This wall is limited by a side 41. The separating element 27 may be not necessarily a hollow box-shaped member. In many cases it may be sufficient that the separating element can be formed as a plate or a disc which would have an inclined portion with the chute angle.

The separating member 27 may be provided with a feeler 90 shown in FIG. 2, projecting in the direction toward the material contained in the housing, this feeler controlling a smallest distance between the separating member and the material in the housing by controlling the movement of said coupling member driven by the motor drives 36, 37.

A control member formed as a shutter 95 shown in FIG. 2 can be provided in the gas supply conduit 23.

It will be understood that each of the elements described above, or two or more together, may also find a useful application in other types of methods and devices for continuous transporting of granulated materials differing from the types described above.

While the invention has been illustrated and described as embodied in a method and a device for transporting granulated materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for continuous transporting materials in powder, fine-grained or coarse-grained state, particularly dam materials in underground mines, comprising at least one storage container containing a material to be transported, a conveyor located below said storage container and receiving the material discharged from said container, said conveyor including at least one tubular housing into which the material is discharged and having an axis; said housing having an inner peripheral wall; a gas pressure supply means connected to said housing and forming therein a pressure gas space; a separating member axially movable in said housing and having one side facing said pressure gas space and an opposite side facing a conveyor space containing said material; and a conveyor discharge pipe connected to said conveyor space, said separating member having a periphery and being formed with at least one opening connected to said conveyor discharge pipe, said separating member being peripherally spaced from said inner peripheral wall of said housing to form therebetween a through passage continually connecting said pressure gas space with said conveyor space so that a pressure gas cushion of a variable size is formed in said conveyor space in the region of said opposite side; said pressure gas cushion being supplied with pressure gas from said pressure gas space whereby a material-pressure gas-mixture stream is formed; said separating member moving said gas pressure cushion axially of said housing against the material contained in said housing, whereby said mixture is continually discharged into said opening and then into said conveyor discharge pipe unless said housing is empty.

2. The device as defined in claim 1, wherein a connecting channel is provided between said opening of the separating member and said conveyor discharge pipe.

3. The device as defined in claim 1, further including a coupling member axially movable in said housing and rigidly connected to said separating member, said separating member and said coupling member forming a piston-shaped structure.

4. The device as defined in claim 3, wherein said conveyor discharge pipe includes two telescopically arranged tubes, an outer one of said tubes being rigidly connected to said housing and an inner one of said tubes being rigidly connected to said separating member in the region of said opening.

5. The device as defined in claim 4, wherein said opening is provided in a lower portion of said separating member.

6. The device as defined in claim 5, further including drive units for moving said coupling member axially in two opposite directions.

7. The device as defined in claim 6, said drive units include each a cylinder-piston unit located outside of said housing and laterally thereof.

8. The device as defined in claim 7, wherein said each cylinder-piston unit includes a piston, the pistons of said cylinder-piston units being connected to each other by a crossbar, said crossbar being coupled to said coupling member.

9. The device as defined in claim 6, wherein said separating member is provided with a feeler projecting in the direction toward the material contained in the housing, said feeler controlling a smallest distance between said separating member and the material by controlling the movement of said coupling member driven by said drive units.

10. The device as defined in claim 9, wherein said pressure gas supply means is provided with a control member.

11. The device as defined in claim 10, said control member being a shutter.

12. The device as defined in claim 3, said coupling member in the region of said separating member being provided with a at least one channel guided through said coupling member.

13. The device as defined in claim 1, wherein said through passage is uniform along said periphery.

14. The device as defined in claim 1, wherein said through passage is slit-shaped 15. The device as defined in claim 1, wherein said separating member has a wall facing said material and inclined to a horizontal at an angle corresponding to the angle of natural slope.

16. The device as defined in claim 1, wherein said one side of said separating member facing said pressure gas space is provided with an inclined profile.

17. The device as defined in claim 1, wherein said separating member is box-shaped.

18. The device as defined in claim 1, wherein said conveyor includes a plurality of housings into which said material is discharged, said housings being operated by a remote control.

19. The device as defined in claim 18, wherein said housing are arranged in succession.

20. The device as defined in claim 1, wherein tubular support elements are inserted between said storage container and said housing, said support elements having passages through which the material passes into said housing.

21. The device as defined in claim 20, wherein said support elements are provided with covers adapted to selectively open or close said passages.

* * * * *